(No Model.)

W. B. SALES.
SHIFTING SEAT FOR VEHICLES.

No. 264,106. Patented Sept. 12, 1882.

Witnesses:— J. M. Decker, W. Bresee

Inventor:— W. B. Sales

United States Patent Office.

WILLIAM B. SALES, OF FORT ATKINSON, WISCONSIN.

SHIFTING SEAT FOR VEHICLES.

SPECIFICATION forming part of Letters Patent No. 264,106, dated September 12, 1882.

Application filed December 13, 1881. (No model.)

*To all whom it may concern:*

Be it known that I, W. B. SALES, a citizen of the United States, residing at Fort Atkinson, in the county of Jefferson and State of Wisconsin, have invented a new and useful Improvement in Vehicle-Seats, of which the following is a specification.

My invention relates to a class of vehicles used to carry persons.

The object of my invention is to provide a vehicle with the seats so arranged that while it may be used as a two-seated vehicle one of the seats may be conveniently folded away for use with a single seat.

Figure 1:
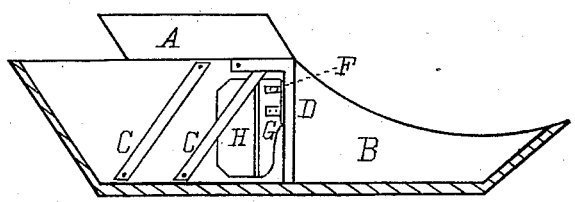
Figure 4:
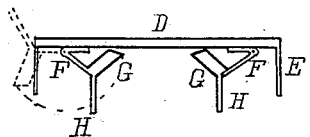
Figure 2:
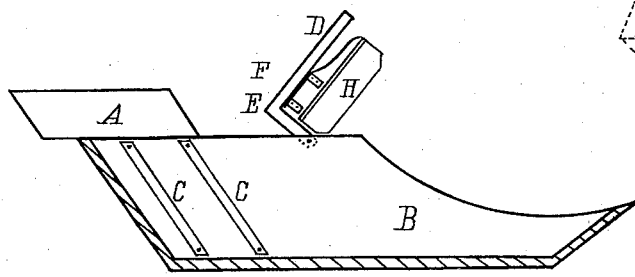
Figure 5:
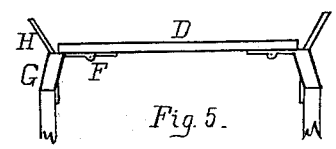
Figure 3:
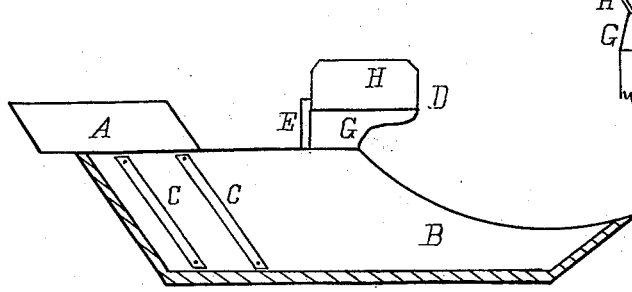

In the drawings, Figure 1 represents the body as with one seat; Fig. 2, the same while unfolding the seats; Fig. 3, as a two-seated body. Fig. 4 is a detached view of seat folded; Fig. 5, detached view of seat in position for use.

Similar letters refer to similar parts throughout.

A, Fig. 1, represents the permanent seat attached to the body B by straps or rods C C', which permit it to be thrown backward onto the rear of the body, as in Figs. 2 and 3.

My folding seat D, when folded, as in Fig. 1, rests on its edge perpendicularly on the bottom of the body, in the place of the fall usually on the seat A. It is attached to the body by a right-angled hinge-strap, E, one arm of which is hinged to the body, while the other is fastened securely to the ends of the seat D, the objects of the right-angled hinge being to raise the seat, when in position, above the upper line of the body, to attach it to the body, and, when fastened to the end of seat, to prevent it from warping or splitting.

To the bottom of the seat D, I attach blocks G G by hinges F F, Figs. 4 and 5, pivoted at a distance from the end of the seat, and having attached a beveled end piece, H. The seat D has a length equal to the distance between the sides of the body-frame. The block G is beveled, or made of sufficient thickness that when opened the end of the seat D rests upon its upper edge, while its lower edge rests upon the body. The end pieces, H H, are attached on a bevel, so as to increase the length of the seat when open. The block G is hinged at a distance from the end of the seat D, so that when folded it will be carried far enough inward to be out of the way of the rods or other devices for swinging or sliding the seat A.

It is operated as follows: The seat A is first thrown back; D is then raised to the position shown in Fig. 2, when the end blocks are turned out to their position at the ends of seat D and the seat lowered to place, as in Fig. 3.

I am aware of patents numbered 49,872, 121,295, and 227,612; and I do not wish to be understood as claiming broadly anything shown, described, or claimed in said patents.

I claim as my invention and desire to secure by Letters Patent—

In shifting seats for vehicles, the combination of the vehicle-body, movable seat A, seat D, the right-angled hinges pivotally connecting the seat D with the body, the hinges F F, connected to the under side of the seat D a short distance from its ends, and the beveled blocks G G, connected to the hinges F, and having beveled end pieces, H H, arranged as shown, said beveled blocks adapted to engage the top edges of the sides of the body and support the seat and end pieces when raised into position, as herein shown and described.

WILLIAM B. SALES.

Witnesses:
CHARLES T. PARSONS,
EDWARD E. RYAN.